United States Patent [19]

Hore

[11] 4,379,257
[45] Apr. 5, 1983

[54] DYNAMO ELECTRIC MACHINES

[76] Inventor: Donald L. Hore, 10, Charnhill Vale, Mangotsfield, Bristol BS17 3JT, England

[21] Appl. No.: 775,441

[22] Filed: Mar. 8, 1977

Related U.S. Application Data

[63] Continuation of Ser. No. 573,602, Apr. 30, 1975, abandoned.

[51] Int. Cl.³ .......................................... H02K 37/00
[52] U.S. Cl. ...................................... 318/695; 310/49
[58] Field of Search .................. 318/695, 122, 123; 310/49, 211, 166, 36–39, 182, 197, 171, 162–165; 336/120

[56] References Cited

U.S. PATENT DOCUMENTS

| | | | |
|---|---|---|---|
| 1,653,946 | 12/1927 | Clausen | 310/49 X |
| 1,863,948 | 6/1932 | Späth | 310/38 |
| 2,279,402 | 4/1942 | Japolsky | 310/49 X |
| 2,454,519 | 11/1948 | McNaney | 310/49 X |
| 3,535,604 | 10/1970 | Madsen et al. | 310/49 X |
| 3,539,847 | 11/1970 | Gifford | 310/49 |

Primary Examiner—Donovan F. Duggan
Attorney, Agent, or Firm—Robert D. Yeager

[57] ABSTRACT

A single phase or multiphase dynamo electric machine including a stator having at least one winding arranged to be energized to provide an alternating flux, and a further member, e.g. a rotor, movable with respect to the stator and having at least one short circuited winding, providing at each position of the movable member alternative paths of low and high reluctance to the passage of alternating magnetic flux, to cause the movable member to adopt a position in which linkage of the short circuited winding(s) with the stator winding(s) is minimized. The machine operates as a rotary solenoid or where the stator windings are in quadrature, as a double acting solenoid. The stator windings may be short circuited to increase the self aligning torque or where three stator windings are provided, by energization of one stator winding and by connecting the non-energized stator windings in opposition, again the self aligning torque can be increased. A linear version of the machine acts as a single acting or double acting linear solenoid.

17 Claims, 15 Drawing Figures

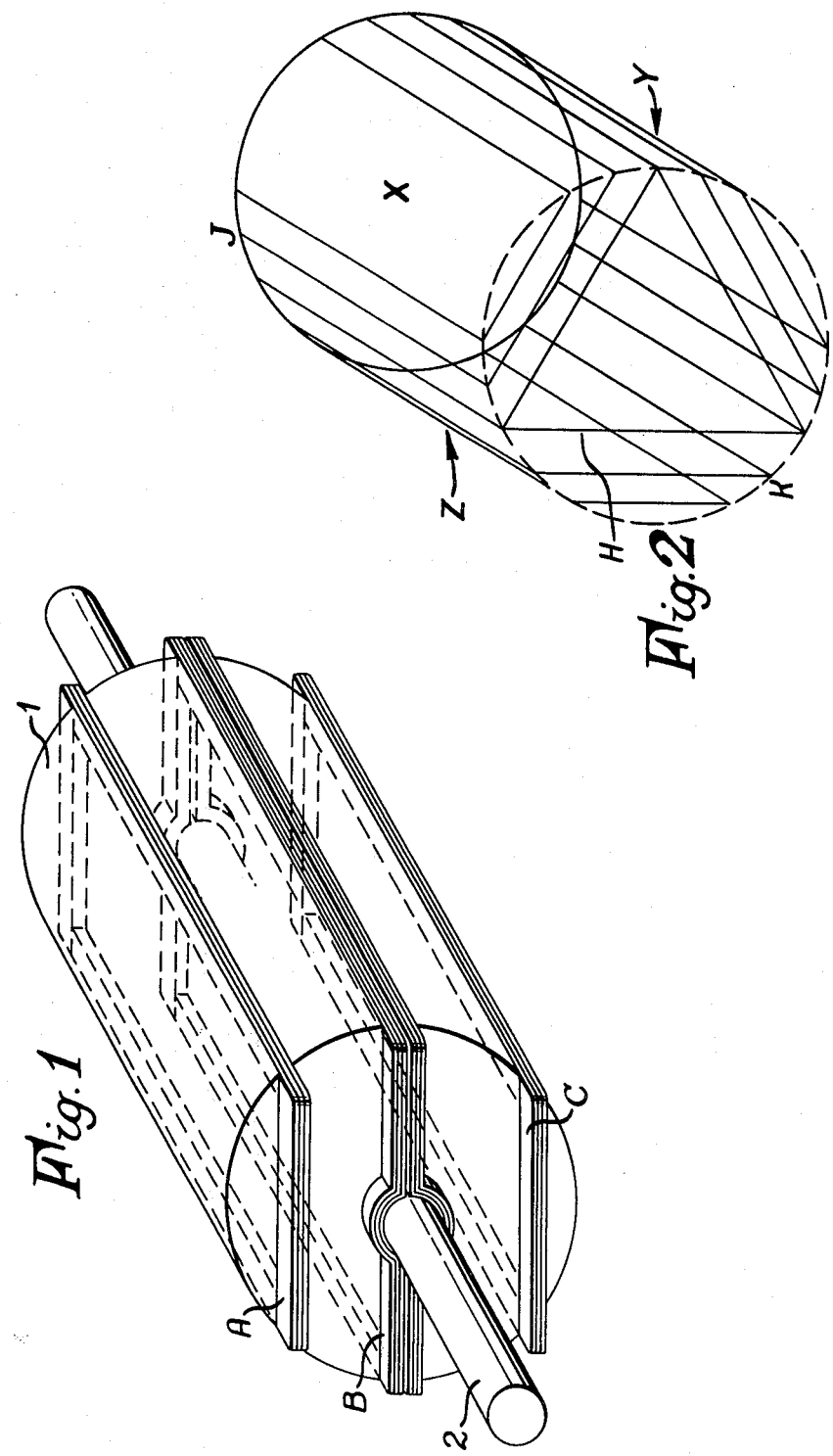

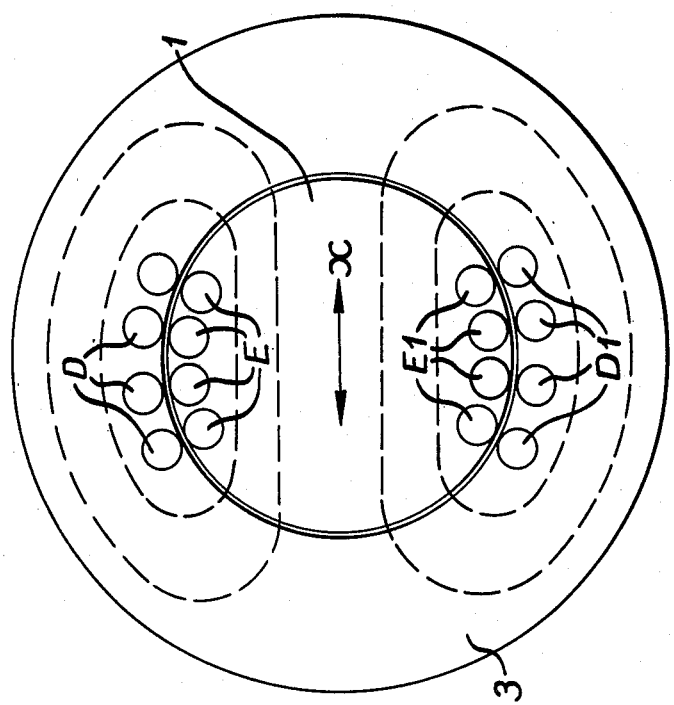
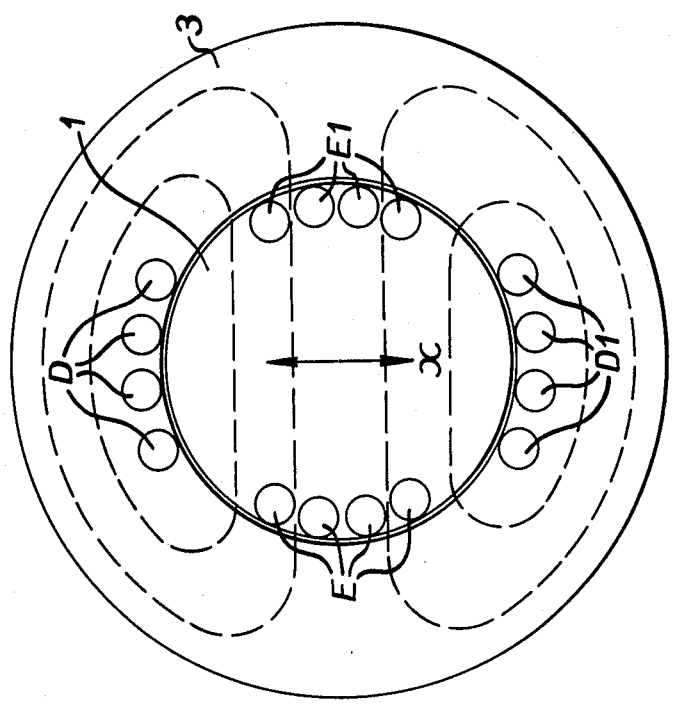

DYNAMO ELECTRIC MACHINES

This is a continuation of application Ser. No. 573,602, filed Apr. 30, 1975.

This invention relates to dynamo electric machines and particularly to dynamo electric machines having windings on both the stator and the rotor, and the machines of the present invention are substantially of the form described in co-pending patent application Ser. No. 17412/73 except that instead of the rotor being positioned and restrained with the object of controlling voltage or current, the rotor is allowed to move in response to electrical power applied to the winding or windings of the stator.

The machines of the present invention have a laminated stator with slots carrying conventional electric motor type distributed windings and a laminated rotor carrying short circuited windings to which there are no external connections. The construction is generally similar to that of a squirrel cage motor; the difference lying in the disposition of the rotor short circuit.

According to the present invention there is provided a single phase or multiphase dynamo electric machine including a stator having at least one winding wound thereon, arranged to be energised to provide alternating or changing flux, and a further member movable with respect to the stator and having at least one short circuited winding providing at each position of the movable member, alternative paths of low and high reluctance to the passage of alternating magnetic flux, to cause the movable member to adopt a position in which linkage of the said at least one short circuited winding of the movable member, with the energised stator winding(s) is minimised.

In two pole form, the machine may be single phase, with rotor short circuiting loops arranged to form parallel flux paths, or three phase, in which the permissive planes for the passage of alternating flux form an equilateral triangle. For machines having more than 2-poles, the permissive planes form geometrical figures with an appropriate number of sides, e.g. a square for single phase four pole machines and a hexagon for three phase four pole machines and so on.

In the simplest single phase version of the machine, the stator carries a single winding to produce a 2-pole field and the single stator winding is energised with A.C. The flux produced will cause the rotor to take up a position in which no flux links the rotor short circuited windings. If the rotor is displaced from this 'null' position, current will flow in the rotor windings to produce a force tending to restore the rotor to the 'null' position. The maximum displacement from the 'null' position is 90° to a position where the rotor short circuited windings are closely linked with the primary stator winding. From this maximum or 'top dead centre' position, the rotor can be rotated in either direction and at this 'top dead centre' position, the torque is theoretically zero but rises rapidly as soon as any movement of the rotor in either direction takes place. Similarly, at the 'null' position, there is also no torque until the rotor is displaced. The machine thus functions as a rotary solenoid for angular displacement up to 90°, depending on the relative force required, if the load or a spring is arranged to displace the rotor from the 'null' position when the stator winding is deenergised.

Similarly, in the equivalent 3-phase 2-pole construction, if the phase windings are energised, the rotor will tend to take up a 'null position', whilst the restoring force will rise to a maximum as the rotor is displaced towards the 'top dead centre' position. The 3-phase construction is therefore usable up to an angular displacement of 60°.

In another embodiment of the invention, two stator windings are arranged in quadrature, and the 'null' position for the rotor with one stator winding energised will be with the rotor axis at 90° to the coil axis of the energised stator winding. With the other stator winding energised the rotor will tend to turn through 90° and thus the machine forms a double acting rotary solenoid by which the load may be moved in either direction through an angle approaching 90° by energisation of one or other of the stator windings. For the equivalent 3-phase construction, the 'null' position is achieved when three stator windings are energised, whilst energisation of the other three windings will tend to cause 60° angular displacement of the rotor for a 3-phase 2-pole construction.

If both stator windings of the double acting machine are energised, the rotor will tend to take up a position intermediate the 'null' and 'top dead centre' position.

In a further embodiment of the invention, the stator windings of the double acting machine which are not energised, are short circuited to achieve a considerable increase in self-aligning torque.

In a still further embodiment of the invention, the machine is provided with three or more stator windings, to achieve angular displacements in excess of 90° (single phase) and 60° (3-phase), the windings being sequentially switched to effect stepping of the rotor. To achieve an increase in self-aligning torque, the windings not energised are connected together in opposition.

In another embodiment of the invention, the machine can operate as a single phase or 3-phase stepping motor by successive energisation of the appropriate windings to effect angular displacement of the rotor in either direction as required.

Although the invention has been described particularly with reference to rotary machines, the principles of operation of the single phase solenoid and the stepping motor can be applied equally to their linear equivalents.

The invention will now be described by way of example only with particular reference to the accompanying drawings wherein:

FIG. 1 is a diagrammatic perspective view of the rotor windings and rotor of a single phase 2-pole dynamo electric machine of the present invention;

FIG. 2 is a diagrammatic illustration of the rotor winding layout of the 3-phase, 2-pole equivalent of FIG. 1;

FIG. 3a is a winding diagram for a single phase 2-pole machine of the present invention having a single stator winding and showing the rotor in the 'null' position;

FIG. 3b is a winding diagram similar to that of FIG. 3a but with the rotor displaced to the 'top dead centre' position;

FIG. 4b is the equivalent 3-phase winding diagram of FIG. 4a;

Figure 4B:
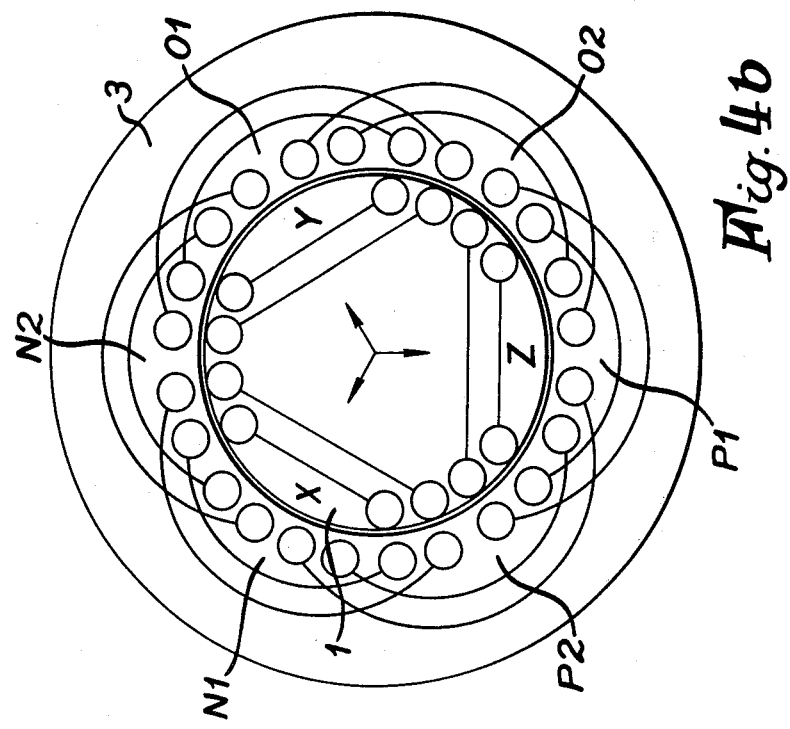
Figure 4A:
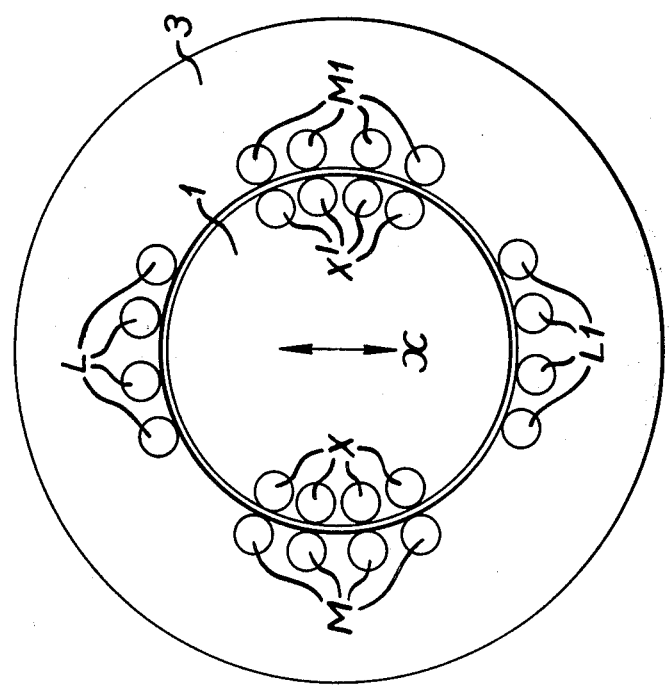
FIG. 4a is a winding diagram for a single phase machine having two stator windings in quadrature and showing the rotor in the 'null' position for one winding energised.
Figure 5A:
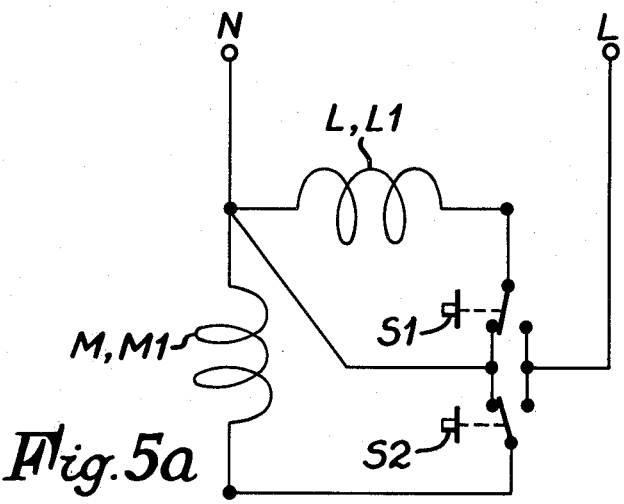
FIG. 5a is a circuit diagram showing a typical connection for a double acting solenoid with the stator winding not energised short circuited to increase the self aligning torque.
Figure 6A:
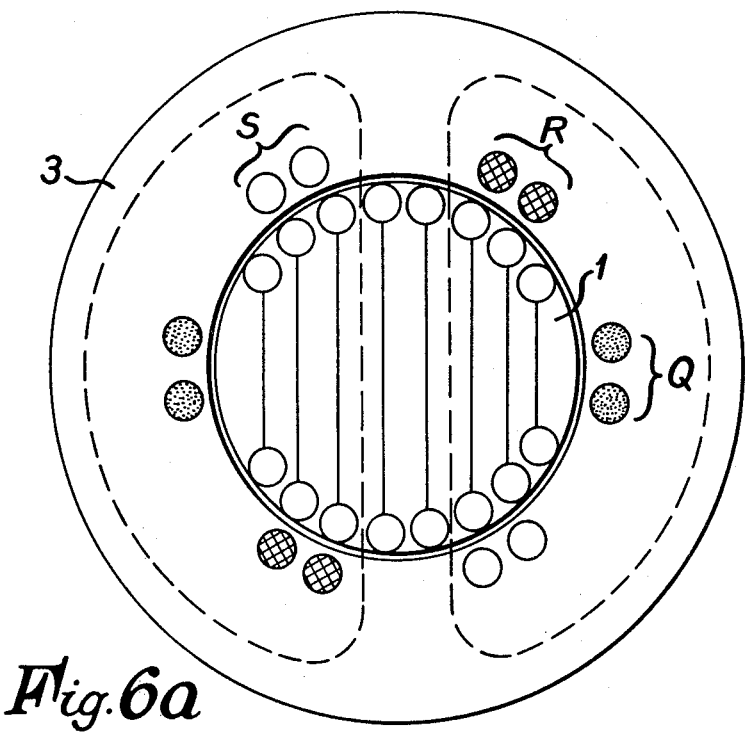
Figure 6B:
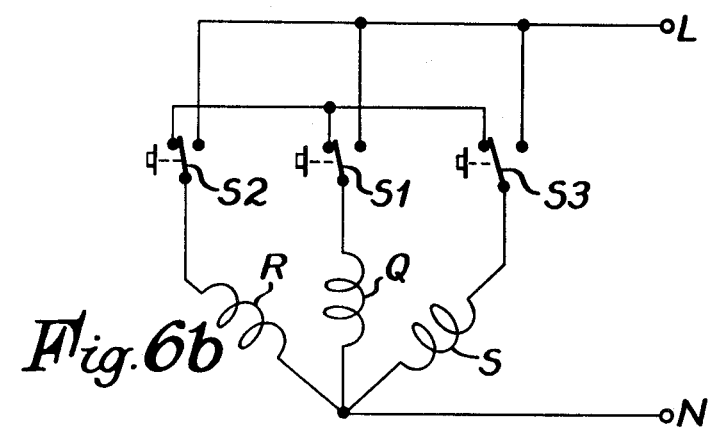
Figure 6B:
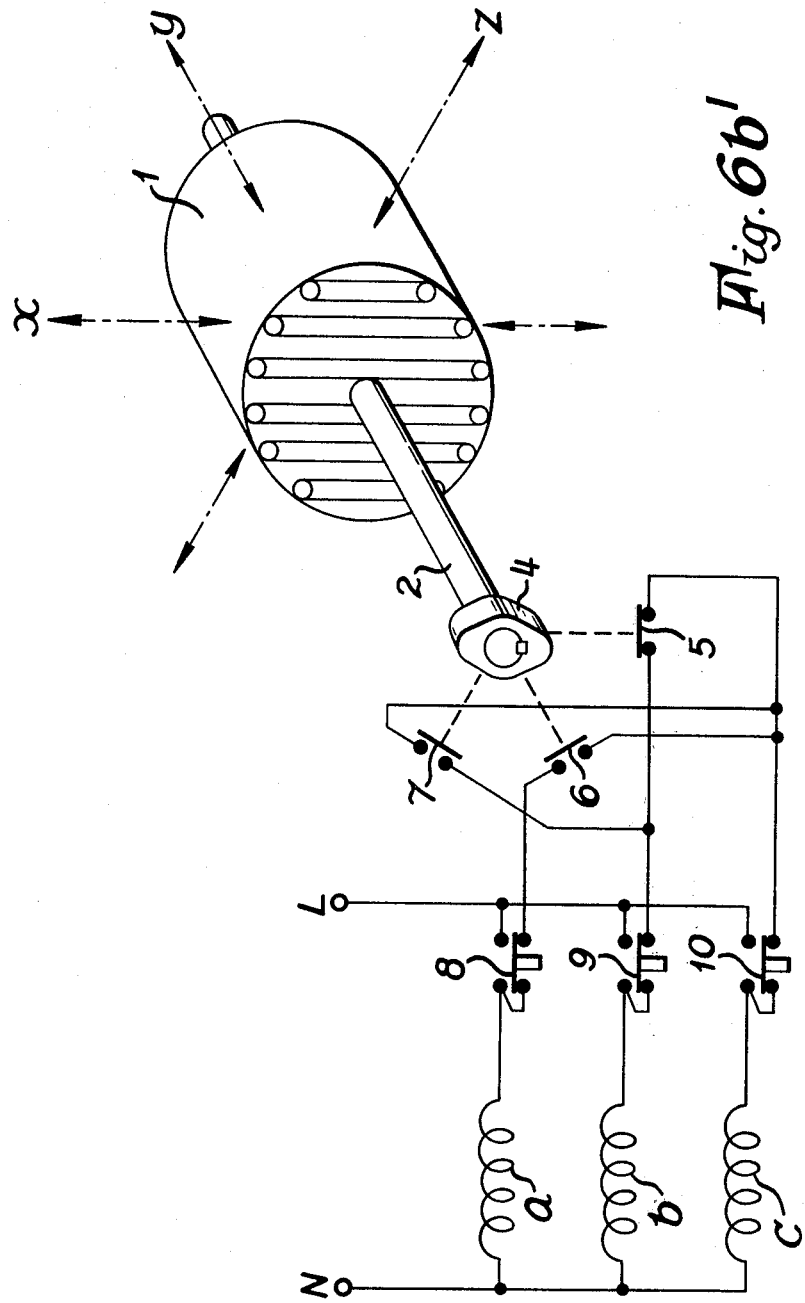
Figure 7:
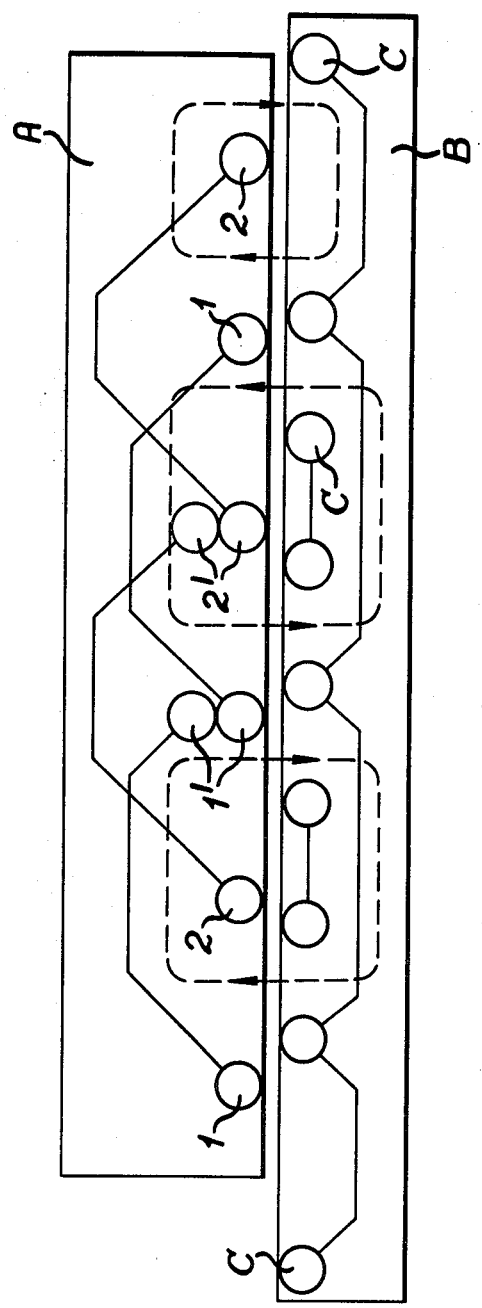

FIG. 5a' is a schematic representation of a single phase 2-pole machine with a pair of stator windings connected in quadrature;

FIG. 6a is a winding diagram for a single phase machine with three 2-pole stator windings and with those windings not energised connected in opposition to increase the self-aligning torque;

FIG. 6b is a circuit diagram showing typical connections for the stator windings of FIG. 6a;

FIG. 6b' is a schematic representation of a single phase 2-pole machine with three stator windings and FIG. 7 is a winding diagram of a linear equivalent of the rotary machine illustrated in FIG. 4a.

FIG. 1 is a schematic representation of the rotor 1 of a single phase 2-pole machine mounted for rotation on shaft 2 and having the windings arranged as three short circuiting loops A, B, C. With the short circuiting loops A, B, C arranged to form parallel flux paths alternating flux is allowed to pass through the iron of the rotor in planes parallel to the plane of the loops, without linking the short circuitry windings, but any component of flux in a plane normal to the plane of the loops must link one or more of the short circuiting windings. The currents thus induced in these windings will oppose the passage of alternating flux, which is therefore cancelled out. The inductive reactance of any stator winding will thus vary with rotor position depending on the degree of linking of the rotor windings with any stator winding. Furthermore, since alternating flux can only pass through the rotor in particular planes, the distribution of flux in a machine having such a rotor construction can be varied with rotor position to vary the inductive linkage between different stator windings. Finally, the current induced in the rotor windings will produce a force tending to move the rotor 1 into a position which will reduce or eliminate the flux linkage with the rotor windings.

FIG. 2 shows the equivalent rotor winding layout for a three-phase 2-pole machine, in which each line H represents a set of conductors laid in a slot in the rotor laminations, joined to form a series of longitudinal parallel loops per phase. One end of the rotor may have the conductors joined into a common end ring J, but the conductors are generally connected as indicated at K. Such a construction forms three pole faces X, Y and Z, and the resulting permissive planes for the passage of alternating flux form an equilateral triangle across these pole faces.

FIGS. 3a and 3b are winding diagrams of the simplest single phase 2-pole version of the machine of the invention. The stator 3 carries a single winding D-D1 which in the position shown in FIG. 3a will direct flux in a horizontal direction through the rotor 1. With the rotor 1 in the position shown, the short circuiting loops E, E1, lie in the horizontal plane with their coil axis x vertical. Flux produced by the single stator winding D-D1 can therefore pass through the rotor 1 in planes parallel to the planes of the short circuiting rotor windings E, E1, without linking of any of the windings E, E1. The flux therefore generates the maximum back emf in the stator winding D, D1, and its reactance is therefore a maximum.

Thus, when the single stator winding D, D1, is energised from an A.C. source, the flux produced will cause the rotor 1 to take up the position shown in FIG. 3a in which no flux links the rotor short circuiting windings E, E1. If the rotor is now angularly displaced from the 'null' position shown in FIG. 3a, current will flow in the rotor windings E, E1, which will in turn produce a force tending to restore the rotor 1 to the 'null' position. The maximum angular displacement of the rotor 1 is 90° to the position shown in FIG. 3b where the rotor and stator coil axes are coincident and where the rotor short circuiting windings E, E1, are closely linked with the stator winding D, D1. From this position, the rotor may be displaced in either direction and the position in FIG. 3b thus represents a 'top dead centre' position at which the torque is theoretically zero but rises rapidly as soon as some movement takes place. At the position shown in FIG. 3a, there is also no torque until the rotor 1 is angularly displaced.

The construction of FIGS. 3a, 3b, thus functions as a rotary solenoid for angular displacement up to 90°, depending on the relative force required, if the load or a spring is arranged to displace the rotor from the 'null' position when the stator winding is deenergised.

Figure 3D:
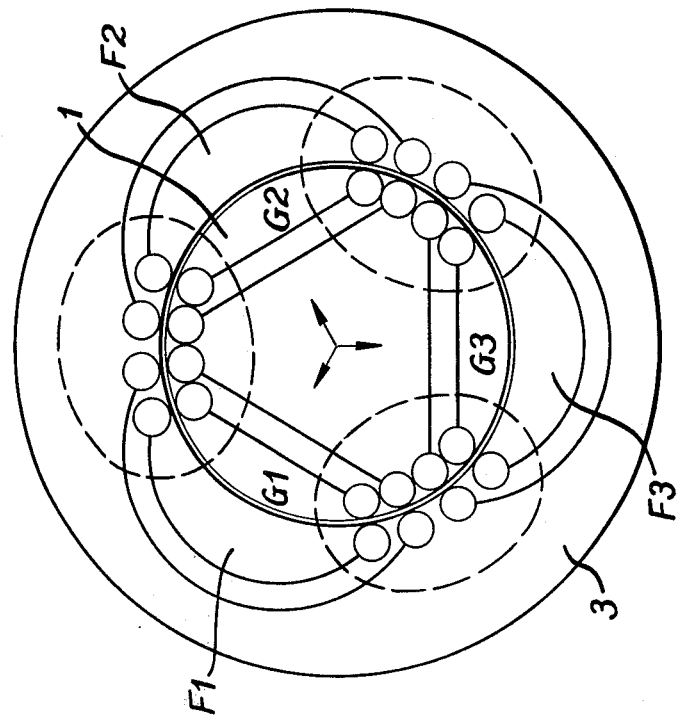
FIGS. 3c and 3d are the equivalent 3-phase winding diagram of FIGS. 3a, 3b respectively.
Figure 3C:
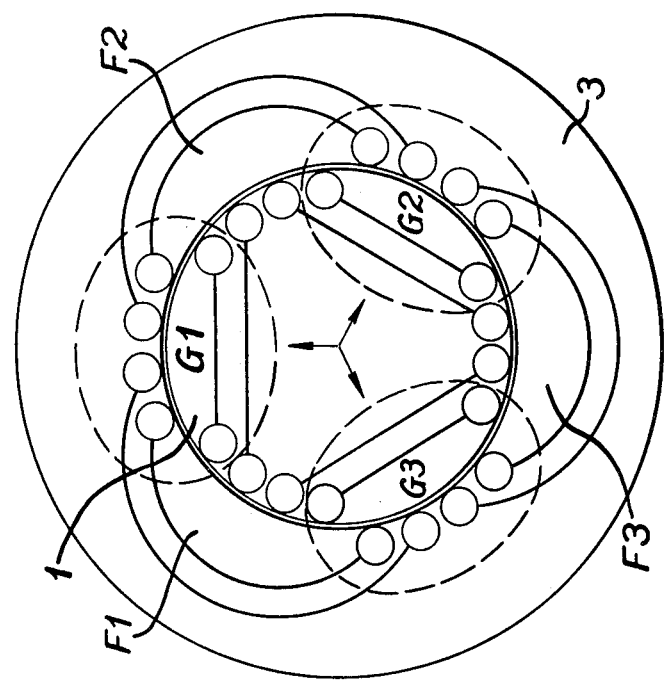

The equivalent 3-phase construction of the rotary solenoid is shown in FIGS. 3c and 3d. The stator 3 is provided with three-phase windings F1, F2, F3 each occupying an arc of approximately 120°. In FIG. 3c flux produced by windings F1, F2, F3 can pass through rotor 1 without linking any rotor short circuiting windings G1, G2, G3, whereas displacement of rotor 1 through an angle of 60° to the position shown in FIG. 3d will produce maximum mutual flux linkage and minimum reactance. Thus, if phase windings F1, F2, F3 are energised, the rotor 1 will tend to take up the position shown in FIG. 3c, i.e. the 'null' position, whilst the restoring force will rise to a maximum as the rotor 1 is angularly displaced towards the 'top dead centre' position shown in FIG. 3d. Thus, the 3-phase construction can be used for angular displacements of up to 60°.

It will be appreciated that all the winding diagrams are for 2-pole machines and the equivalent multipole machines, i.e. poles in excess of 2, can be constructed if required for smaller angular displacements.

A machine utilising the principles of the present invention can be used as a double acting solenoid by providing two stator windings L, L1; M, M1; in quadrature, as shown in FIG. 4a. With stator winding L, L1 energised, the rotor 1 is in the 'null' position with the rotor coil axis x normal to the coil axis of windings L, L1. With energisation of stator winding M, M1, the rotor 1 will tend to turn through 90° to bring the rotor coil axis normal to that of M, M1. The construction described thus forms a double acting rotary solenoid by means of which a load may be moved in either direction through an angle approaching 90° by energisation of one or other of the stator windings. The machine will function as a double acting rotary solenoid actuator for angles less than 90°, e.g. for remote operation of rotary switches.

The equivalent 3-phase arrangement is shown in FIG. 4b, with the rotor in the 'null' position for initial energisation of phase windings N2, O2, P2. Energisation of the other three phase windings N1, O1, P1, will effect 60° angular displacement of rotor 1 for a 2-pole construction.

If both sets of windings N1, O1, P1; N2, O2, P2; are energised, the rotor 1 will tend to take up a position intermediate the two 'null' positions.

Figure 5B:
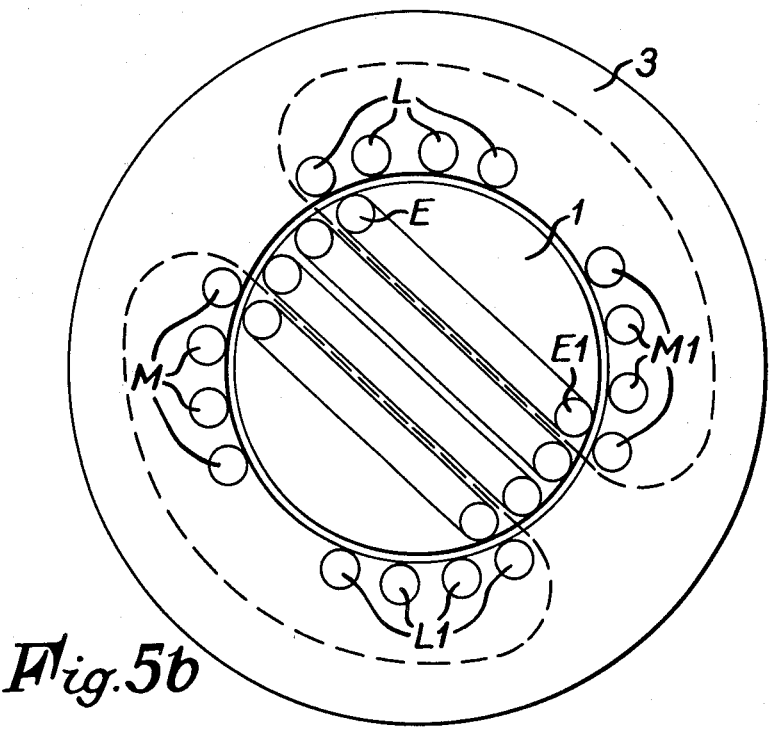
FIG. 5b is a winding diagram of a machine having a short circuited stator winding with the rotor displaced from a 'null' position to an intermediate position.
Figure 5A:
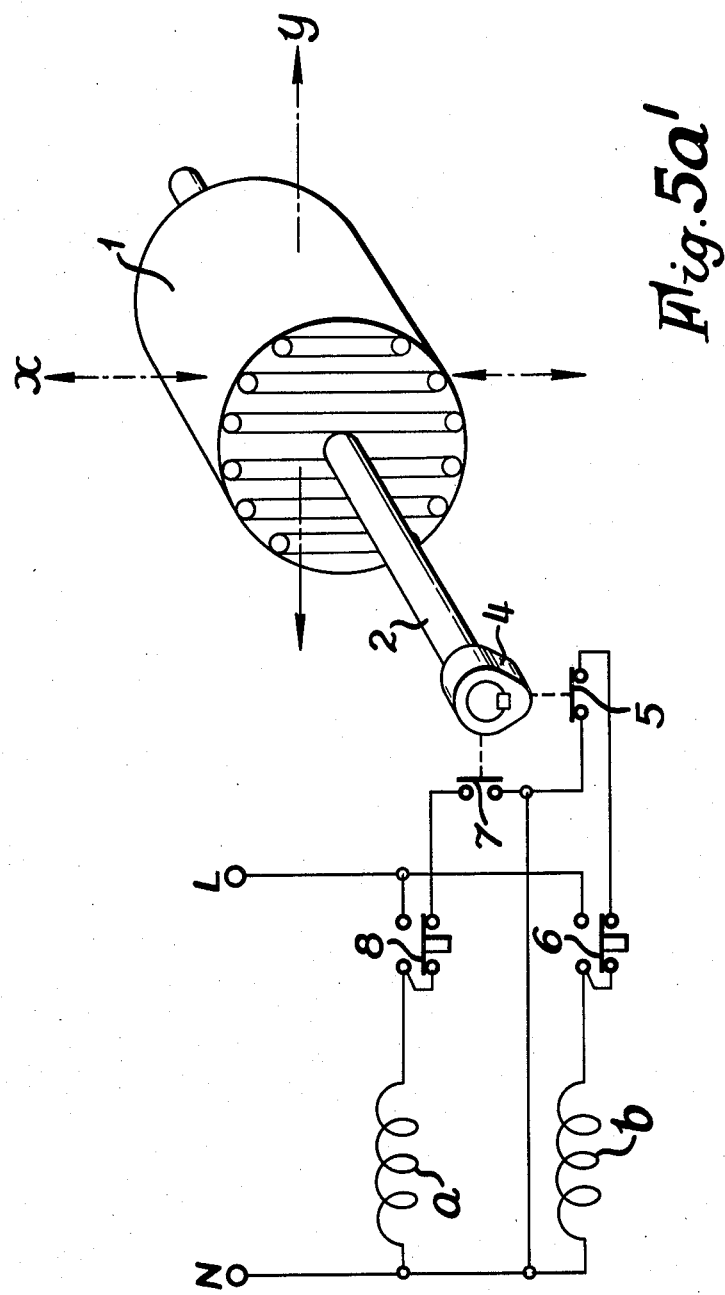

To increase the self aligning torque, the stator windings of the double acting solenoid of FIG. 4a, are short circuited as shown in FIG. 5a. As long as the rotor is displaced from the 'null' position to a position such as shown in FIG. 5b, a current will be induced in the short circuited stator winding. Control pushbuttons or switches S1, S2, are connected in circuit with the energising source and the windings L, L1; M, M1; depression of switch S2 connecting winding M, M1, across the source with short circuiting of winding L, L1, and vice versa. Thus, a current will be induced in short circuited winding L, L1. In FIG. 5b, the rotor is at the intermediate position showing flux from stator winding L, L1, linking stator winding M, M1 to cause a circulating current to flow through the short circuiting windings E, E1 of the rotor 1. As long as the rotor is displaced from the 'null' position, a current will be induced in the short circuited stator winding as well as in the rotor short circuiting loops because the machine acts as a variable transformer as described in co-pending patent application Ser. No. 17412/73. This effect will be in such a direction and phase relationship as to tend to restore the rotor to the null position up to 45 electrical degrees from the 'null' position.

While this connection may be arranged by suitable external switching, maximum effectiveness may be achieved by automatic switching from the rotor position. This is illustrated in principle in FIG. 5a', which represents a single phase 2-pole double acting machine with stator windings a and b in quadrature. The stator is omitted for simplicity, but the flux axes of these windings are indicated at x, y, respectively. Rotor 1 is in the 'null' position corresponding to stator winding a energised. The rotor shaft 2 carries a suitable switching means such as a cam 4 which causes contact 5 to close if the rotor 1 is within 45 degrees of the 'null' position. This short-circuits winding b unless and until winding b is energised by depression of pushbutton 6. In this event, the rotor 1 will swing into alignment with flux axis b (assuming mechanical restraint incorporated to permit movement only within the quadrant shown). As the required position is approached, contact 5 breaks and contact 7 closes to short-circuited stator winding a. A further pushbutton 8 is connected in series with winding a and contact 7.

An equivalent 3-phase version may be developed from the 3-phase construction of FIG. 4b by arranging for phases N1, O1, P1 to be individually short circuited whilst phases N2, O2, P2 are energised and vice versa.

Where angular displacements in excess of 90° (single phase) or 60° (3-phase) are required the machine of the present invention is provided with three or more stator windings. In FIG. 6a for the single phase 2-pole construction three 2-pole stator windings Q, R, S are spaced 60° apart, the windings being sequentially switched either by an external programme or automatically by a switch (not shown) actuated by movement of the rotor 1. FIG. 6a shows the rotor 1 in the 'null' position for energisation of stator winding Q. If winding R is energised, the rotor will move through 60° and transferring the supply to winding S will step the rotor through a further 60°. Progressive movement through intermediate positions may be achieved, e.g. by progressive energisation of stator windings R and Q, R, R and S and S by an appropriate switching sequence.

Again, the self-aligning torque can be increased by connecting together in opposition, the two windings not energised as shown in FIG. 6b for the three stator windings Q, R, S, of FIG. 6a. By appropriate actuation of push-button switches S1, S2, S3, one winding can be energised and the remaining two connected in opposition. With winding Q energised by actuation of switch S1, equal voltages will be induced in windings Q and R, so no current circulates with the rotor 1 in the 'null' position for winding Q. If the rotor 1 is displaced, however, the voltage induced in one winding will fall and in the other winding will rise and circulating current will flow. This will have the effect of increasing the force tending to restore the rotor to the 'null' position. A more detailed circuit is shown in FIG. 6b' which shows a typical arrangement for a single-phase 2-pole machine having three stator windings at 60 degrees to each other. The stator is omitted for clarity, but the flux axes for stator windings a, b and c are shown at x, y, z, respectively. The rotor position is 'null' for stator winding a energised. Cam 4 attached to rotor 1 via shaft 2 closes contact 5 to connect stator windings b and c together in opposition as long as the rotor is within a specific displacement of the 'null' position, and neither of pushbuttons 9 or 10 is depressed. A further cam controlled contact 6 is connected in series with pushbutton 8 and a further cam controlled contact 7 is connected in circuit with pushbutton 9. Referring to FIG. 6b' it is apparent that the voltages induced in windings b and c by a with the rotor 1 in the 'null' position will be equal, and thus no current will circulate. Displacing the rotor 1 to the left or right to about 30 electrical degrees will increase the voltage in one winding as the voltage in the other falls, and a current will circulate to increase the force tending to restore the rotor 1 to the null position. The same principles apply to the equivalent 3-phase version if each phase is switched as for the single phase construction of FIG. 6b.

Although the machines so far described require part-turn angular displacement, it will be appreciated that the same principles may be applied to construct a reversible stepping motor of single phase or 3-phase construction with at least three windings per phase. Successive energisation of the appropriate windings via external switches will effect progressive motion of the rotor in either direction as required.

Furthermore, the single phase solenoid and stepping motor principles can be applied equally to a linear machine as well as a rotary machine. Thus, referring to FIG. 7 there is shown a winding layout for a linear version of the FIG. 4a double acting solenoid embodiment in which A represents the stator and B the 'rotor' or movable member. The short-circuiting windings C on the rotor B are arranged such that there will be mutual linkage between them and one or more stator windings 1, 1'; 2, 2'; unless the 'rotor' B is in a particular position relative to the stator A.

The arrangement of FIG. 7 shows the rotor B in a position in which a small amount of movement to the left will eliminate entirely linkage between stator windings 2, 2', and the rotor short circuiting windings C. The dotted lines show how flux produced can pass from and return to the stator A without inducing currents in the rotor windings C. Furthermore, if stator windings 1, 1' are energised instead of windings 2, 2', the flux linkage with the rotor windings C would approach a maximum. This would cause rotor B to move to the right as viewed in FIG. 7 until such flux linkage was minimised.

With windings 1, 1' only, the machine functions as a single acting linear solenoid whilst with two stator windings 1, 1'; 2, 2'; it functions as a double acting solenoid. Provision of three or more stator windings would permit a stepping action.

Where a prime factor in design is achievement of minimum inertia of moving parts, the rotor short circuited windings of both rotary and linear machines described hereinabove may be accommodated in the air gap between the stator and a further fixed mass of magnetic material, which may also carry energising stator winding or windings.

I claim:

1. An alternating current dynamo electric machine comprising:
    a stator having at least one winding wound thereon, arranged to be energized with alternating current to provide a magnetic flux field which is continually alternating or changing in magnitude; and a further member, formed of a ferromagnetic material, movable with respect to the stator and having at least one short circuited winding formed thereon and movable unitarily therewith, providing at each position of the movable member, alternative paths of low and high reluctance to the passage of the alternating magnetic flux, to cause the ferromagnetic movable member to adopt a 'null' position in which linkage of the said at least one short circuited winding of the movable member, with the energized at least one stator winding is minimized.

2. A dynamo electric machine as claimed in claim 1 wherein the movable member is a rotor mounted for rotation on a shaft within said stator to define a constant small air gap and provided with a plurality of short circuiting loops arranged to form parallel flux paths and allowing alternating flux to pass through the rotor in planes parallel to the planes of the loops without linking the short circuited windings when the rotor is in a 'null' position with respect to the stator, the inductive reactance of the at least one stator winding varying with the displacement of the rotor relative to the stator according to the degree of linking of the rotor short circuited loops with said at least one stator winding, so that a force is produced tending to restore the rotor to the 'null' position in which such linkage is minimum.

3. A dynamo electric machine as claimed in claim 1 wherein the movable member is a rotor mounted for rotation on a shaft and having 3-phase windings on the rotor, the permissive planes for the passage of alternating flux of the rotor windings being 120 electrical degrees apart.

4. A dynamo electric machine as claimed in claim 1 and arranged to operate as a double acting rotary solenoid wherein the movable member is a rotor and the stator is provided with two A.C. windings in quadrature, energization of one stator winding with the rotor coil axis normal to the coil axis of the energized winding constituting a 'null' position for the rotor relative to that winding and energization of the second stator winding causing the rotor to be angularly displaced by 90° to the 'null' position for the second winding.

5. A dynamo electric machine as claimed in claim 1 wherein the movable member is a rotor and the stator is provided with two sets of 3-phase windings, energisation of one set setting the rotor to a 'null' position for that set, and energisation of the second set of windings effecting a 60 electrical degrees angular displacement of the rotor to a 'null' position for the second set.

6. A dynamo electric machine as claimed in claim 4 wherein energization of both windings or sets of windings causes the rotor to take up a position intermediate the 'null' position for the first and second windings or sets of windings.

7. A dynamo electric machine as claimed in claim 4 wherein switching means are provided to effect short circuiting of that stator winding not energized, displacement of the rotor inducing a current in the short circuited winding as well as the rotor short circuiting windings to produce a force tending to restore the rotor to the 'null' position.

8. A dynamo electric machine as claimed in claim 5 wherein switching means are provided to effect short circuiting of that set of 3-phase windings not energised, displacement of the rotor inducing a current in the short circuited windings as well as the rotor short circuiting windings to produce a force tending to restore the rotor to the 'null' position.

9. A dynamo electric machine as claimed in claim 1 wherein the stator is provided with at least three windings per phase, and means for sequentially energising the stator windings to effect stepping of the rotor.

10. A dynamo electric machine as claimed in claim 9 wherein switching means are provided for connecting the windings of the stator not energised in opposition to increase the self-aligning torque of the rotor.

11. A dynamo electric machine as claimed in claim 1 wherein the movable member is arranged to move past the stator in a linear manner, the arrangement being such that mutual linkage is effected between the stator and movable member windings unless the movable member assumes a particular predetermined position with respect to the rotor, interlinking of the flux paths between the windings on the movable and stator members effecting linear displacement of the movable member with respect to the stator.

12. A dynamo-electric machine operable from an A.C. source comprising:
    a stator having at least one winding would thereon arranged to be energized from the A.C. source to provide changing flux;
    a movable member formed of a ferromagnetic material disposed for movement relative to said stator;
    means disposed on said movable member for providing parallel alternate paths of low and high reluctance to the passage of alternating magnetic flux through said movable member to cause said movable member to adopt a position wherein substantially all the changing flux goes through the low reluctance paths when said stator is energized.

13. A dynamo-electric machine as claimed in claim 12 wherein:
    said movable member is a laminated rotor which defines a constant small air gap relative to said stator; and,
    said means for providing alternate paths of low and high reluctance comprise a plurality of short circuited conducting loops disposed in spaced apart parallel planes.

14. A dynamo-electric machine as claimed in claim 13 wherein:
    said stator is provided with two windings which are angularly displaced; and,
    means for selectively energizing one of the two windings so that the rotor moves to a position wherein substantially all the changing flux from the energized winding goes through the low reluctance paths.

15. A dynamo electric machine as claimed in claim 14 comprising:
   shorting means for shorting the stator winding which is not energized.

16. A dynamo electric machine operable from an alternating current source comprising:
   a stator having a plurality of angularly spaced apart windings formed thereon and having a cylindrical opening formed therethrough;
   a ferromagnetic cylindrical rotor supported for rotary movement within the cylindrical rotor opening to define a small air gap between said stator and said rotor;
   a plurality of parallel short circuited loops disposed on said rotor, for unitary movement therewith, to define alternate paths of low and high reluctance to the passage of alternating magnetic flux through said ferromagnetic rotor; and,
   switching means for connecting the alternating current source to a selected winding on said stator to form a spatially stationary but temporally alternating magnetic flux field which causes said rotor to adopt a position wherein the flux linkage with the energized stator winding is minimized.

17. A dynamo electric machine as claimed in claim 16 comprising:
   shorting means for shorting selected windings on said stator which are not energized so displacement of the rotor from the minimized flux linkage position induces a current in the shorted stator windings which tends to move the rotor to the minimized flux linkage position.

* * * * *